United States Patent [19]
Ogura

[11] 3,870,533
[45] Mar. 11, 1975

[54] HYDRAULIC COMPOSITION

[75] Inventor: Shunichiro Ogura, Tokyo, Japan

[73] Assignee: Nippon Zeon Co., Ltd., Tokyo, Japan

[22] Filed: Nov. 26, 1973

[21] Appl. No.: 419,062

[30] Foreign Application Priority Data
Dec. 8, 1972   Japan................................. 47-12310

[52] U.S. Cl..................................... 106/90, 106/97
[51] Int. Cl.................................................. C04b 7/02
[58] Field of Search............................. 106/90, 97

[56] References Cited
UNITED STATES PATENTS

| | | | |
|---|---|---|---|
| 2,314,846 | 3/1943 | McClellan et al. | 260/468 |
| 3,145,774 | 8/1964 | Patchen | 106/90 |
| 3,232,777 | 2/1966 | Bush | 106/97 |

*Primary Examiner*—J. Poer
*Attorney, Agent, or Firm*—Sherman & Shalloway

[57] ABSTRACT

A hydraulic composition comprising 100 parts by weight of a hydraulic substance and 0.01-5 parts by weight of a 3,6-endomethylenehexahydro-o-phthalic acid-4-sulfonic acid derivative of the formula

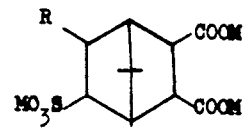

wherein R is a member selected from the group consisting of hydrogen, an alkyl radical of 1-4 carbon atoms and the —COOM group, and M is a member selected from the group consisting of hydrogen, an alkali metal atom, a half atom of an alkaline earth metal and the ammonium group, which M may be the same or different.

2 Claims, No Drawings

HYDRAULIC COMPOSITION

This invention relates to a hydraulic composition which can provide mortar or concrete of good workability by the addition of a relatively small amount of water and, in addition, manifests high strength at a relatively early period after the mortar or concrete has set.

As this kind of hydraulic composition, there has been known hitherto that prepared by incorporating in the hydraulic substance an additive such as polyalkylarylsulfonates or lignin sulfonates obtained from the sulfite pulping process, etc. However, these additives were not entirely satisfactory, since they did not manifest any effects when used in small amounts. On the other hand, when they are used in too great an amount, there were such drawbacks as that an excessive amount of air would be entrained, that setting would be retarded, or that drop in the strength of the hardened product would be brought about.

The object of this invention resides in finding a new additive not possessing these drawbacks and thus provide an improved hydraulic composition.

I found that the foregoing object could be achieved by using as the additive 3,6-endomethylene-hexahydro-o-phthalic acid-4-sulfonic acid derivatives of the formula

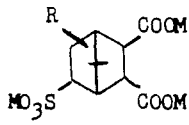

wherein R is either hydrogen, an alkyl radical of 1 – 4 carbon atoms of the —COOM group, and M, which may be the same or different, is either hydrogen, an alkali metal atom, a half atom of an alkaline earth metal or the ammonium group. Hence, in accordance with the present invention, there is provided a novel hydraulic composition which comprises a hydraulic substance incorporated with this type of additive.

It is disclosed in U.S. Pat. No. 2,314,846 that an ester of sulfonated cis-endomethylene-3,6-tetrahydrophthalic acid is used as a detergent. However, there is no suggestion at all therein of 3,6-endomethylene-hexahydro-o-phthalic acid-4-sulfonic acid being effective as an additive to be used with the hydraulic substances.

By the expression "hydraulic substance", as herein used, is meant, as usually defined, a substance that has the property of hardening by setting up a hydration reaction when mixed with water. As typical examples, mention can be made of portland cement, alumina cement, blast furnace slag and mixtures of quicklime and siliceous sand.

The 3,6-endomethylene-hexahydro-o-phthalic acid-4-sulfonic acid derivatives of the foregoing generic formula are exemplified by such as 3,6-endomethylene-hexahydro-o-phthalic acid-4-sulfonic acid, methyl-3,6-endomethylene-hexahydro-o-phthalic acid-4-sulfonic acid, carboxy-3,6-endomethylene-hexahydro-o-phthalic acid-4-sulfonic acid, and the sodium, potassium, magnesium, calcium and ammonium salts of the foregoing several compounds.

While there is imposed no particular restriction as to the amount these additives are added to the hydraulic substance, conveniently used is 0.01 – 5 parts by weight, and especially 0.05 – 1 part by weight, per 100 parts by weight of the hydraulic substance.

The hydraulic composition of the invention obtained by incorporating the aforesaid additives in the hydraulic substance not only excels in its workability when it is to be mixed with water but also excels in its workability when the resulting mortar or concrete is to be used. Moreover, it can impart great strength to the hardened mortar or concrete at an early period. The mechanism by which these effects are brought about in the invention hydraulic composition is not clear. However, it is presumed that in all probability these effects result from an increase taking place in the solubility of the hydrated alumina siliceous substances present at the particle surface of the hydraulic substance due to the fact that the 3,6-endomethylene-hexahydro-o-phthalic acid-4-sulfonic acid derivatives are highly soluble in water, with the consequence that the hydration reaction is promoted.

The following examples are given for specifically illustrating the present invention.

EXAMPLE 1

Eight parts by weight of sodium hydroxide and 16.4 parts by weight of 3,6-endomethylene-1,2,3,6-tetrahydrophthalic anhydride were added to 100 parts by weight of water to obtain a homogeneous solution of disodium-3,6-endomethylene-1,2,3,6-tetrahydro-o-phthalate. On addition of 10.4 parts by weight of sodium hydrogen sulfite to the so obtained solution and stirring the mixture, the reaction proceeded exothermically. After the evolution of heat has stopped, the stirring was continued for a further 2 hours at 60°C. The water was then removed with the use of a rotating evaporator to obtain 33 parts by weight of a white powder of trisodium-3,6-endomethylene-hexahydro-o-phthalic acid-4-sulfonate [I].

A concrete test was conducted for clarifying the performance of this compound [I] when used as a concrete additive. The results obtained are shown in Table 1.

The composition of the concrete used in the test was as follows:

| | |
|---|---|
| Portland cement | 300 kg/m³ |
| Coarse aggregates (river gravel of maximum particle diameter of 25 mm | 1200 kg/m³ |
| Fine aggregates (river gravel of maximum particle diameter of 2.5 mm) | 760 kg/m³ (ratio of fine aggregates = 39%) |

However, in the case of the control experiment not using the additive, the amount of fine aggregates was changed to 800 kg/cm³ (fine aggregates = 40 percent).

Table 1

| | Additive | | | | | Compressive strength (kg/cm²) | |
|---|---|---|---|---|---|---|---|
| | Name | Ratio of addition to cement (%) | Water to cement ratio (%) | Slump (cm) | Amount of air (%) | After 7 days | After 28 days |
| Present | Compound | 0.125 | 45 | 6.5 | 2.2 | 230 | 359 |

Table 1 — Continued

| | Additive | | Water to cement ratio (%) | Slump (cm) | Amount of air (%) | Compressive strength (kg/cm$^2$) | |
| --- | --- | --- | --- | --- | --- | --- | --- |
| | Name | Ratio of addition to cement (%) | | | | After 7 days | After 28 days |
| Control | Not added | — | 53 | 6.5 | 1.6 | 181 | 291 |
| | Commercial lignin sulfonic acid type additive | 0.25 | 45 | 6.5 | 4.1 | 224 | 335 |

Note: The slump, amount of air and compressive strength were determined in accordance with the JISA Methods 1101, 1116 and 1108, respectively.

Table 2

| | Additive | | Water to cement ratio (%) | Slump (cm) | Amount of air (%) | Compressive strength (kg/cm$^2$) | |
| --- | --- | --- | --- | --- | --- | --- | --- |
| | Name | Ratio of addition to cement (%) | | | | After 7 days | After 28 days |
| Present invention | Compound (II) | 0.25 | 45 | 7.1 | 3.0 | 224 | 356 |
| | Compound (III) | 0.25 | 45 | 8.1 | 2.2 | 244 | 377 |
| Control | not added | — | 53 | 6.5 | 1.5 | 220 | 337 |

It is apparent from the table that the performances of the concrete incorporated with the compound [I] of the present invention are much superior to the performances of the concrete incorporated with the commercial ligninsulfonic acid type additive not to mention the concrete not incorporated with an additive.

EXAMPLE 2

By operating as in Example 1 but using 17.8 parts by weight of 5-methyl-3,6-endomethylene-1,2,3,6-tetrahydrophthalic anhydride instead of 16.4 parts by weight of 3,6-endomethylene-1,2,3,6-tetrahydrophthalic anhydride, 34.4 parts by weight of trisodium-5-methyl-3,6-endomethylene-hexahydro-o-phthalic acid-4-sulfonate [II] was obtained.

Operating in like manner but using 20.8 parts by weight of 5-carboxy-3,6-endomethylene-1,2,3,6-tetrahydrophthalic anhydride instead of 16.4 parts by weight of 3,6-endomethylene-1,2,3,6-tetrahydrophthalic anhydride and by using the sodium hydroxide in an amount of 12 parts by weight, 37.4 parts by weight of tetrasodium-5-carboxy-3,6-endomethylene-hexahydro-o-phthalic acid-4-sulfonate [III] was obtained.

For clarifying the performances of the compounds [II] and [III], when used as a concrete additive, a concrete test was conducted, with the results shown in Table. The composition of the concretes used in the test was the same as that of Example 1.

It can be appreciated from Table 2 that, despite the fact that the amount used of water is less in the case of the concrete incorporated with the invention compounds [II] and [III] than in the case of the concrete not incorporated with an additive, satisfactory fluidity is demonstrated. In addition, it is seen that the strength enhancement effect of the concrete incorporated with the invention compounds is greater after the concrete has set.

I claim:

1. A hydraulic composition comprising 100 parts by weight of a hydraulic substance and 0.01 – 5 parts by weight of a 3,6-endomethylene-hexahydro-o-phthalic acid-4-sulfonic acid derivative of the formula

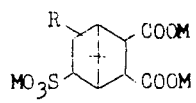

wherein R is a member selected from the group consisting of hydrogen, an alkyl radical of 1 – 4 carbon atoms and the —COOM group, and M is a member selected from the group consisting of hydrogen, an alkali metal atom, a half atom of an alkaline earth metal and the ammonium group, which M may be the same or different.

2. A composition according to claim 1 wherein the hydraulic substance is portland cement.

* * * * *

UNITED STATES PATENT OFFICE
CERTIFICATE OF CORRECTION

PATENT NO. : 3,870,533
DATED : March 11, 1975
INVENTOR(S) : SHUNICHIRO OGURA

It is certified that error appears in the above-identified patent and that said Letters Patent are hereby corrected as shown below:

In the Heading, correct patentee's Foreign Application Priority Data to read as follows:

-- Dec. 8, 1972    Japan................. 47-123103 --

Signed and sealed this 29th day of April 1975.

(SEAL)
Attest:

RUTH C. MASON
Attesting Officer

C. MARSHALL DANN
Commissioner of Patents
and Trademarks